United States Patent
Ogawa

(10) Patent No.: US 10,901,372 B2
(45) Date of Patent: Jan. 26, 2021

(54) TIME SYNCHRONIZATION DEVICE, TIME SYNCHRONIZATION SYSTEM, AND TIME SYNCHRONIZATION METHOD

(71) Applicant: NEC Corporation, Tokyo (JP)

(72) Inventor: Takatoshi Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 259 days.

(21) Appl. No.: 15/118,326

(22) PCT Filed: Feb. 10, 2015

(86) PCT No.: PCT/JP2015/000603
§ 371 (c)(1),
(2) Date: Aug. 11, 2016

(87) PCT Pub. No.: WO2015/122175
PCT Pub. Date: Aug. 20, 2015

(65) Prior Publication Data
US 2017/0176953 A1 Jun. 22, 2017

(30) Foreign Application Priority Data
Feb. 13, 2014 (JP) .................................. 2014-025564

(51) Int. Cl.
*G04R 20/02* (2013.01)
*G04G 5/00* (2013.01)
(Continued)

(52) U.S. Cl.
CPC .............. *G04R 20/02* (2013.01); *G04G 5/00* (2013.01); *G04G 7/00* (2013.01); *H04J 3/0673* (2013.01); *H04J 3/0644* (2013.01)

(58) Field of Classification Search
CPC ........ G04R 20/02; G06F 15/16; H04J 3/0685; H04J 3/0667; H04J 3/0664; H04J 3/06;
(Continued)

(56) References Cited

U.S. PATENT DOCUMENTS

2002/0058518 A1* 5/2002 Mitsugi .................... G04G 5/00
455/456.1
2004/0109474 A1  6/2004 Koshino et al.
(Continued)

FOREIGN PATENT DOCUMENTS

EP        1427121 A1    6/2004
JP    2002-156477 A    5/2002
(Continued)

OTHER PUBLICATIONS

International Search Report corresponding to PCT/JP2015/000603 dated May 19, 2015 (2 pages).

*Primary Examiner* — Hardikkumar D Patel
(74) *Attorney, Agent, or Firm* — Wilmer Cutler Pickering Hale and Dorr LLP

(57) ABSTRACT

In order to simplify calculation of delay time lengths in a time synchronization device in a packet network, when executing time synchronization using a synchronization signal sent via the packet network, this time synchronization device 20 includes: a data receiving unit 21 that receives synchronization information including a time correction field used when correcting synchronization time information in a client device 30; a before-data-processing time correcting unit 22 that updates the time correction field by subtracting information indicating a time at which synchronization information is received, from the time correction field; an after-data-processing time correcting unit 23 that updates the time correction field by adding information indicating a time after performing data processing on the synchronization information, to the time correction information of the time correction field updated by the before-data-processing time correcting unit 22; and a data sending unit 24 that sends the updated synchronization information to the client device 30.

9 Claims, 10 Drawing Sheets

(51) Int. Cl.
*G04G 7/00* (2006.01)
*H04J 3/06* (2006.01)

(58) Field of Classification Search
CPC ...... H04J 3/0641; H04J 3/0676; H04J 3/0638;
H04J 3/0682; H04J 3/0673; H04J 3/14;
H04L 1/205; H04L 7/00; H04L 69/28;
H04L 69/40; H04L 67/125; H04L 7/0016;
H04L 29/06; H04L 29/08; H04L 29/14;
H04L 67/104
See application file for complete search history.

(56) References Cited

U.S. PATENT DOCUMENTS

| | | | | |
|---|---|---|---|---|
| 2010/0250781 A1* | 9/2010 | Matsunaga | ............ | H04L 1/205 709/248 |
| 2013/0272352 A1* | 10/2013 | Kamada | ............ | H04J 3/0667 375/219 |
| 2014/0362872 A1* | 12/2014 | Grenabo | ............ | H04J 3/0638 370/507 |
| 2015/0071309 A1* | 3/2015 | Aweya | ............ | H04J 3/0682 370/503 |
| 2015/0249514 A1* | 9/2015 | Le Pallec | ............ | H04J 3/0664 370/216 |

FOREIGN PATENT DOCUMENTS

| | | |
|---|---|---|
| JP | 2004-186877 A | 7/2004 |
| JP | 2010-232845 A | 10/2010 |
| JP | 2011-176479 A | 9/2011 |
| JP | 2012-520591 A | 9/2012 |
| JP | 2013-514688 A | 4/2013 |

* cited by examiner

TIME SYNCHRONIZATION DEVICE, TIME SYNCHRONIZATION SYSTEM, AND TIME SYNCHRONIZATION METHOD

CROSS-REFERENCE TO RELATED APPLICATIONS

This application is a national stage application of International Application No. PCT/JP2015/000603 entitled "Time Synchronization Device, Time Synchronization System, and Time Synchronization Method" filed on Feb. 10, 2015, which claims priority to Japanese Application No. 2014-025564 filed on Feb. 13, 2014, the disclosures of which are hereby incorporated by reference in their entirety.

TECHNICAL FIELD

The present invention relates to a time synchronization device, a time synchronization system, and a time synchronization method, and relates to, for example, a time synchronization device, a time synchronization system, and a time synchronization method for transmitting synchronization information via a network.

BACKGROUND ART

A global navigation satellite system (GNSS) receiver receives a signal (synchronization signal) broadcasted from a GNSS satellite when performing time synchronization necessary in using a global positioning system (GPS) or the like. The GNSS receiver can output a timing signal synchronized with the universal time coordinated (UTC), using the received synchronization signal.

Further, in order to use a synchronization signal also in a communication device at a position where the synchronization signal cannot be received directly from the GNSS satellite, the GNSS receiver that receives the synchronization signal from the GNSS satellite may send the synchronization signal to the communication device via a packet network.

The synchronization signal sent via the packet network, however, involves a transmission delay. Further, a value of the transmission delay fluctuates because of a traffic situation or the like in the packet network. For this reason, the communication device needs to use the synchronization signal by taking into account the transmission delay or the like occurring in the packet network.

It is prescribed that a transparent clock device is used for reducing a transmission delay in an IEEE1588v2 network designed for performing phase synchronization using packet data (synchronization packet). The transparent clock device writes, in a correction field of a coming synchronization packet, a time length for being retained in the transparent clock device and sends, to a communication device, the synchronization packet whose correction field is updated.

PTL1 describes a process using a transparent clock for measuring a processing delay occurring in a relay device. Specifically, it is assumed that a time when a relay device 1 receives a synchronization signal sent from a time server is designated by T1, and a time when a relay device 2 sends, to a client device, the synchronization signal sent from the relay device 1 is designated by T2. The relay device 2 stores the times T1 and T2 in a storage unit, and a delay calculating unit uses T1 and T2 to calculate processing delay lengths in the relay device 1 and the relay device 2.

CITATION LIST

Patent Literature

[PTL1] Japanese Laid-open Patent No. 2011-176479
[PTL2] Japanese Translation of PCT Application Published as No. 2012-520591
[PTL3] Japanese Translation of PCT Application Published as No. 2013-514688

SUMMARY OF INVENTION

Technical Problem

The time synchronization device (relay device) disclosed in PTL1, however, needs a storage unit storing time information used for calculating the delay length. Thus, a memory resource needs to be allocated to the storage unit. Further, the delay calculating unit in the time synchronization device calculates the delay length, using the time information stored in the storage unit. For this reason, it is necessary to perform a process of storing the time information in the storage unit, a process of acquiring the time information from the storage unit by the delay calculating unit, and a process of calculating the delay length by the delay calculating unit, before the delay length is calculated. For this reason, there is a problem that a load of the time synchronization device increases because of performing calculation of the delay length.

An object of the present invention is to provide a time synchronization device, a time synchronization system, and a time synchronization method that simplify a process of calculating a delay length in the time synchronization device in a packet network at the time of performing time synchronization by using a synchronization signal sent via the packet network.

Solution to Problem

A time synchronization device according to a first aspect of the present invention is provided with: data receiving means for receiving synchronization information sent from a time standard device, the synchronization information including a time correction field used when correcting synchronization time information generated so as to synchronize with time information generated in the time standard device; before-data-processing time correcting means for updating the time correction field by subtracting information indicating a time at which the synchronization information is received, from time correction information set in the time correction field; after-data-processing time correcting means for updating the time correction field by adding information indicating a time after performing data processing on the synchronization information, to the time correction information in the time correction field updated by the before-data-processing time correcting means; and data sending means for sending, to a client device, the synchronization information whose time correction field is updated by the after-data-processing time correcting means.

A time synchronization system according to a second aspect of the present invention is provided with: a time standard device generating time information; a client device generating synchronization time information synchronized with the time information generated in the time standard device; and a time synchronization device relaying, between the time standard device and the client device, synchronization information including a time correction field used when the synchronization time information is corrected, wherein the time synchronization device includes: data receiving means for receiving synchronization information sent from the time standard device; before-data-processing time correcting means for updating the time correction field by subtracting information indicating a time at which the synchronization information is received, from time correction information set in the time correction field; after-data-processing time correcting means for updating the time correction field by adding information indicating a time after performing data processing on the synchronization information, to the time correction information in the time correction field updated by the before-data-processing time correcting means; and data sending means for sending, to the client device, the synchronization information whose time correction field is updated by the after-data-processing time correcting means.

A time synchronization method according to a third aspect of the present invention includes: receiving synchronization information sent from a time standard device, the synchronization information including a time correction field used when correcting synchronization time information generated so as to synchronize with time information generated in the time standard device; updating the time correction field by subtracting information indicating a time at which the synchronization information is received, from time correction information set in the time correction field; updating the time correction field by adding information indicating a time after performing data processing on the synchronization information, to the time correction information of the updated time correction field; and sending, to a client device, the synchronization information whose time correction field is updated.

Advantageous Effect of Invention

The present invention can provide a time synchronization device, a time synchronization system, and a time synchronization method that can simplify a process of calculating a delay length in the time synchronization device in a packet network at the time of performing time synchronization by using a synchronization signal sent via the packet network.

DESCRIPTION OF EMBODIMENTS

Exemplary Embodiment 1

Figure 1:
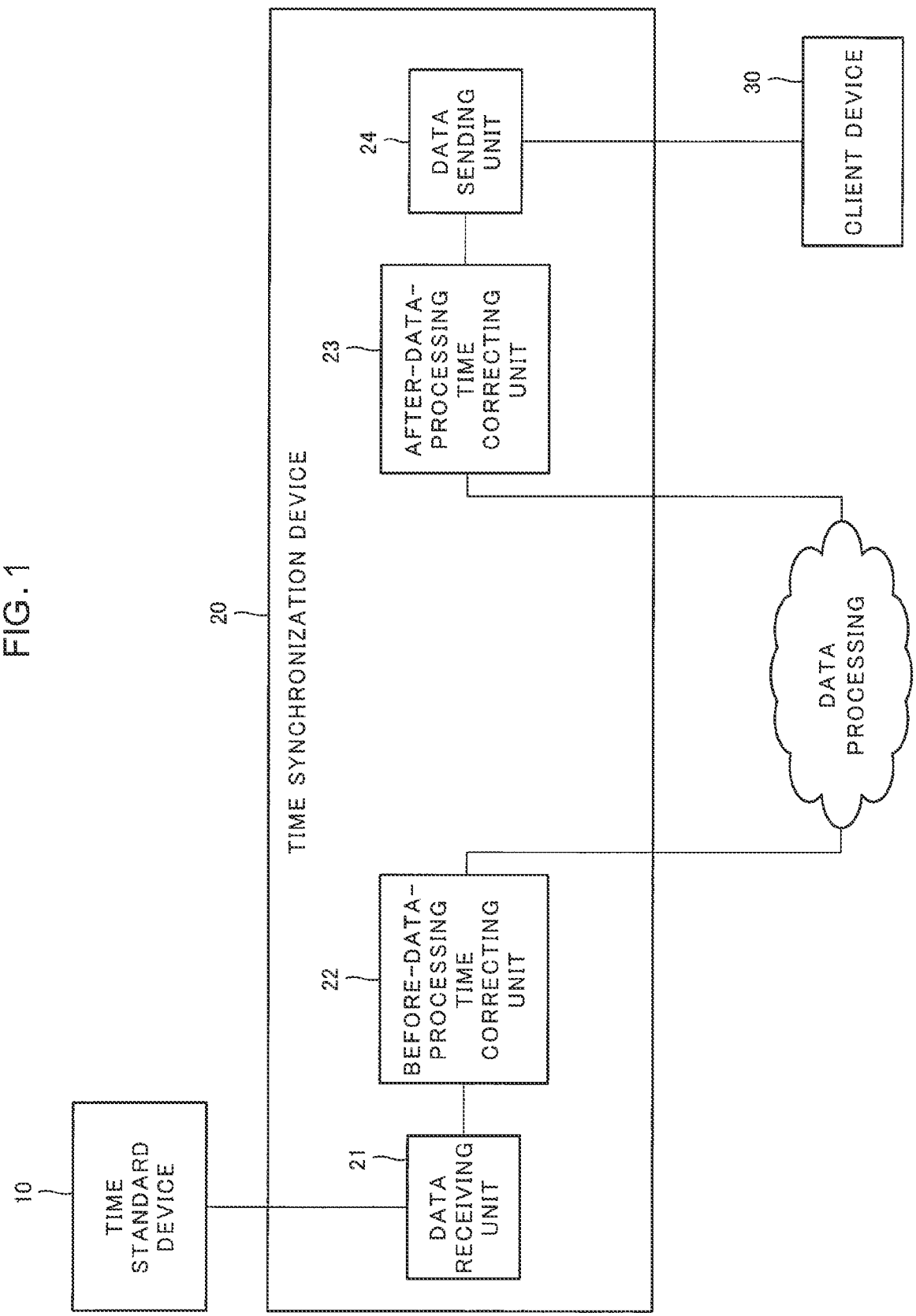
FIG. 1 is a configuration diagram of a time synchronization device according to an exemplary embodiment 1.

The following describes an exemplary embodiment of the present invention, referring to the drawings. A time synchronization system in FIG. 1 includes a time standard device 10, a time synchronization device 20, and a client device 30. The time synchronization device 20 relays communication between the time standard device 10 and the client device 30. For example, the time synchronization device 20 may be a device constituting a network that relays communication between the time standard device 10 and the client device 30. The network that relays communication between the time standard device 10 and the client device 30 may be a packet network that transmits packet data using the Ethernet (registered trademark), for example.

The time standard device 10 may be a device generating synchronization information synchronizing with the UTC, for example. Alternatively, the time synchronization device 10 may be a device generating synchronization information synchronizing with the Japan Standard Time, the TAI (international atomic time), the global positioning system (GPS) time, or the like used by synchronizing with the UTC. Note that the "TAI" is an abbreviation for "Temps Atomique International".

The client device 30 uses the synchronization information to generate synchronization time information so as to synchronize with time information generated in the time standard device 10. The synchronization information includes a time correction field used when the synchronization time information generated in the client device 30 is corrected. The client device 30 corrects the synchronization time information using a value set in the time correction field. A value set in the time correction field may be, for example, a counter value indicating time information, or the other value. A value set in the time correction field may be called as time correction information.

Next, a configuration example of the time synchronization device 20 is described. The time synchronization device 20 includes a data receiving unit 21, a before-data-processing time correcting unit 22, an after-data-processing time correcting unit 23, and a data sending unit 24.

The data receiving unit 21 receives the synchronization information sent from the time standard device 10. In this example, the synchronization information is a synchronization packet. For example, the data receiving unit 21 receives, via a packet network, the synchronization information sent from the time standard device 10. The data receiving unit 21 then outputs the received synchronization information to the before-data-processing time correcting unit 22.

At this time, the data receiving unit 21 may output, to the before-data-processing time correcting unit 22, information indicating the time that the synchronization information is received, in addition to outputting the synchronization information to the before-data-processing time correcting unit 22. Alternatively, the data receiving unit 21 may set, in the synchronization information, the information concerning the time that the synchronization information is received by the data receiving unit 21. The data receiving unit 21 may then output, to the before-data-processing time correcting unit 22, the synchronization information including the set information concerning the time of the reception of the synchronization information.

Note that in the present exemplary embodiment, a relay device is not particularly arranged between the time standard device 10 and the data receiving unit 21. Without being limited to this, however, one relay device or plural relay devices may be arranged so that the data receiving unit 21 receives the synchronization information sent via the one relay device or the plural relay devices.

The before-data-processing time correcting unit 22 extracts the time correction information set in the time correction field of the synchronization information. The before-data-processing time correcting unit 22 subtracts, from the extracted time correction information, the information indicating the time of the reception of the synchronization information, and updates the time correction field. Here, the time of the reception of the synchronization information is, for example, the time when the data receiving unit 21 receives the synchronization information. Note that the time of the reception of the synchronization information is not limited to this, and may be, for example, the time when the before-data-processing time correcting unit 22 receives the synchronization information output from the data receiving unit 21.

The before-data-processing time correcting unit 22 outputs the synchronization information whose time correction field has been updated to a circuit, a functional block, or the like that performs data processing. The circuit, the functional block, or the like that performs the data processing may be, for example, processing for controlling a transmission route of the synchronization information, and the like, in the packet network, processing on information set in another packet layer, or processing on information set in a layer upper than a packet layer. The data processing may be called as a packet processing, for example.

The synchronization information on which the data processing has been performed by the circuit or the like that performs the data processing is output to the after-data-processing time correcting unit 23. The after-data-processing time correcting unit 23 extracts the time correction information set in the time correction field of the output synchronization information. The after-data-processing time correcting unit 23 adds, to the extracted time correction information, information indicating the time after performing the data processing of the synchronization information, and updates the time correction field.

The time after performing the data processing of the synchronization information may be, for example, the time that the after-data-processing time correcting unit 23 receives the synchronization information on which the data processing has been performed. Alternatively, the time after performing the data processing of the synchronization information may be, for example, the information indicating the time that the data sending unit 24 sends the synchronization information to the client 30.

The after-data-processing time correcting unit 23 outputs, to the data sending unit 24, the synchronization information whose time correction field has been updated. The data sending unit 24 sends, to the client device 30, the synchronization information output from the after-data-processing time correcting unit 23.

The data sending unit 24 sends the synchronization information to the client device 30 via the packet network, for example. Also, in the present exemplary embodiment, a relay device is not particularly arranged between the data sending unit 24 and the client device 30. Without being limited to this, however, one relay device or plural relay devices may be arranged so that the client device 30 receives the synchronization information sent via the one relay device or the plural relay devices.

As described above, the time synchronization device 20 according to the exemplary embodiment 1 of the present invention includes the before-data-processing time correcting unit 22 and the after-data-processing time correcting unit 23. In addition, these before-data-processing time correcting unit 22 and after-data-processing time correcting unit 23 update the time correction field so that the time synchronization device 20 can reflect data-processing time length of the synchronization information in the time correction field. In other words, the before-data-processing time correcting unit 22 and the after-data-processing time correcting unit 23 update the time correction field to thereby make it unnecessary for the time synchronization device 20 to hold the time information such as the reception time and the sending time of the synchronization information. For this reason, it is unnecessary for the time synchronization device 20 to secure a memory for holding the time information.

Further, in the time synchronization device 20, the before-data-processing time correcting unit 22 and the after-data-processing time correcting unit 23 can directly update the time correction field of the synchronization information. This makes it unnecessary for the time synchronization device 20 to include a circuit, a functional block, or the like for calculating the data-processing time length. Therefore, it is possible to simplify a process of calculating the data-processing time length. In other words, it is unnecessary for the time synchronization device 20 to perform processes such as the process of holding the time information and the process of extracting the time information and calculating the data-processing time length. In contrast to the case of performing these processes, performing the process of updating the time correction field enables to calculate the data-processing time length. Thus, the time synchronization device 20 can simplify the calculation of the data-processing time length.

Exemplary Embodiment 2

Using FIG. 2 to FIG. 6, the following describes an exemplary embodiment 2 of the present invention. In the present exemplary embodiment, the relay device (time synchronization device) 20 differs from the time synchronization device 20 of FIG. 1 in that an internal clock unit 25 is added, otherwise the other configuration is the same as the time synchronization device 20 of FIG. 1. For this reason, detailed description of the same configuration as FIG. 1 is omitted.

Figure 2:
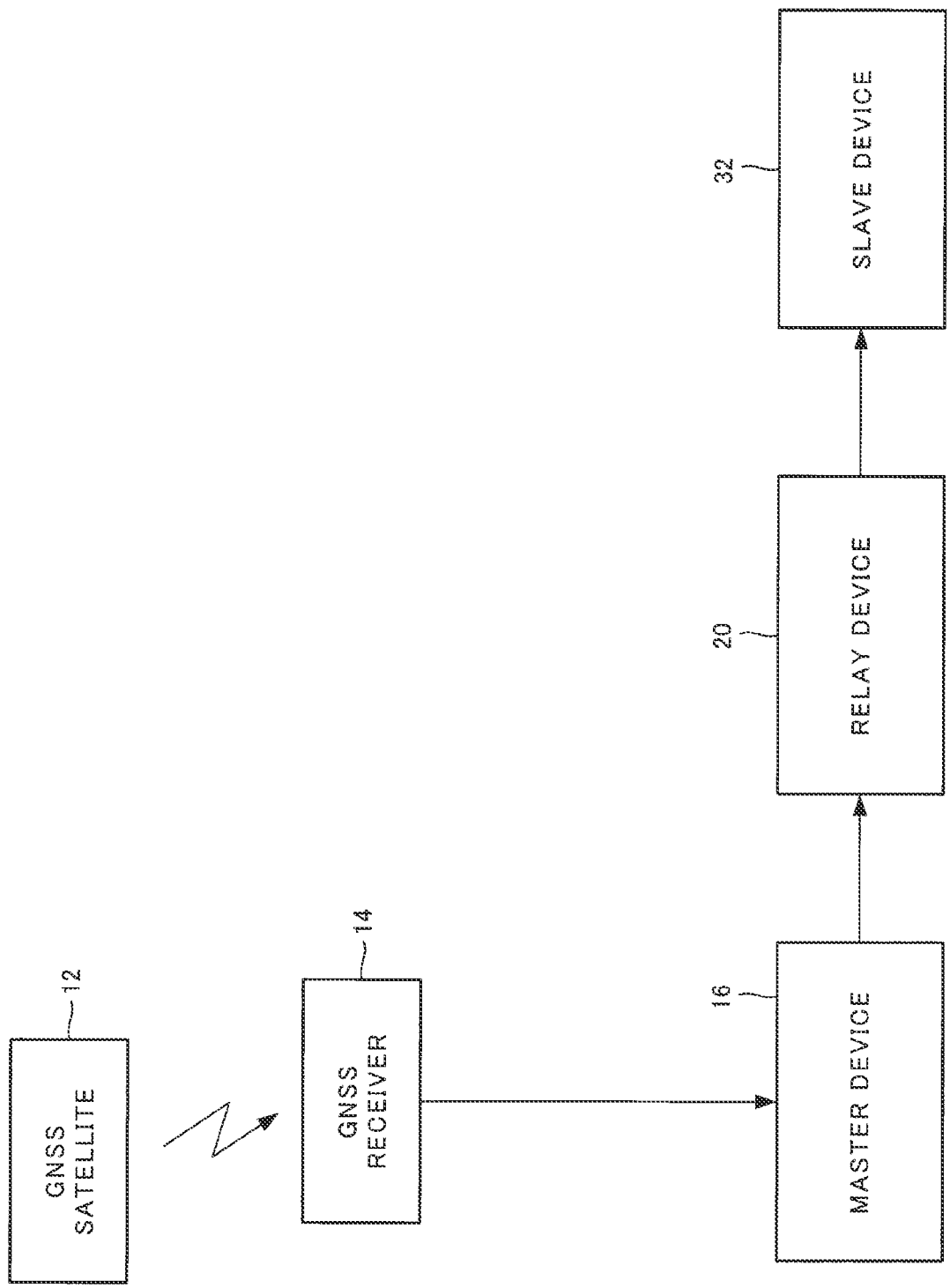
FIG. 2 is a configuration diagram of a time synchronization system according to an exemplary embodiment 2.

First, a configuration example of the time synchronization system according to the exemplary embodiment 2 of the present invention is described using FIG. 2. The time synchronization system in this drawing includes a GNSS satellite 12, a GNSS receiver 14, a master device 16, a relay device 20, and a slave device 32.

The GNSS satellite 12 sends a GNSS broadcasting signal that synchronizes with the UTC. Further, the GNSS is a general term of a satellite positioning system including the GPS, the GLONASS, the Galileo, the Compass, the Quasi-Zenith Satellite System (QZSS), and the like. The GNSS receiver 14 receives the GNSS broadcasting signal sent from the GNSS satellite 12. The GNSS receiver 14 reproduces a synchronization signal on the basis of the GNSS broadcasting signal, and sends the reproduced synchronization signal to the master device 16. Note that the function of the GNSS receiver 14 and the function of the master device 16 may be incorporated into the same device.

The master device 16 sends the synchronization signal to the slave device 32 via the relay device 20. For example, the synchronization signal is a clock signal generated by using the GNSS broadcasting signal. Here, the master device 16 sends the synchronization signal to the slave device 32 using the method prescribed in the IEEE1588 (hereinafter referred to as IEEE1588 transmission) or the synchronous Ethernet (registered trademark) (hereinafter referred to as SyncE) method, for example. The IEEE1588 transmission and the SyncE transmission are performed via the Ethernet (registered trademark). Further, the IEEE1588 may be called as Precision Time Protocol (PTP). Examples of the method prescribed in the IEEE1588 include an updated version such as the IEEE1588Version2 (IEEE1588v2).

The relay device 20 is a device sending packet data via the Ethernet and arranged in a packet network. Although the drawing illustrates a configuration where one relay device 20 is arranged in the packet network between the master device 16 and the slave device 32, plural relay devices 20 may be arranged in the packet network between the master device 16 and the slave device 32.

The relay device 20 receives the synchronization information sent from the master device 16. Further, the relay device 20 reflects a data-processing time length of its own device in a time correction field of the synchronization information. In other words, the relay device 20 updates the time correction field of the synchronization field. The relay device 20 sends, to the slave device 32, the synchronization information whose time correction field has been updated. When the plural relay devices are arranged in the packet network, the relay device 20 may receive the synchronization information sent from the other relay device, and further, the relay device 20 may send the updated synchronization information to the other relay device.

The slave device 32 receives the synchronization information sent via the relay device 20. Further, the slave device 32 uses the received synchronization information to generate synchronization time information that synchronizes with the time information generated by the GNSS receiver 14, the master device 16, or the like. The synchronization time information may be generated using such as the above-mentioned method prescribed in the IEEE1588, or the other method.

Figure 3:
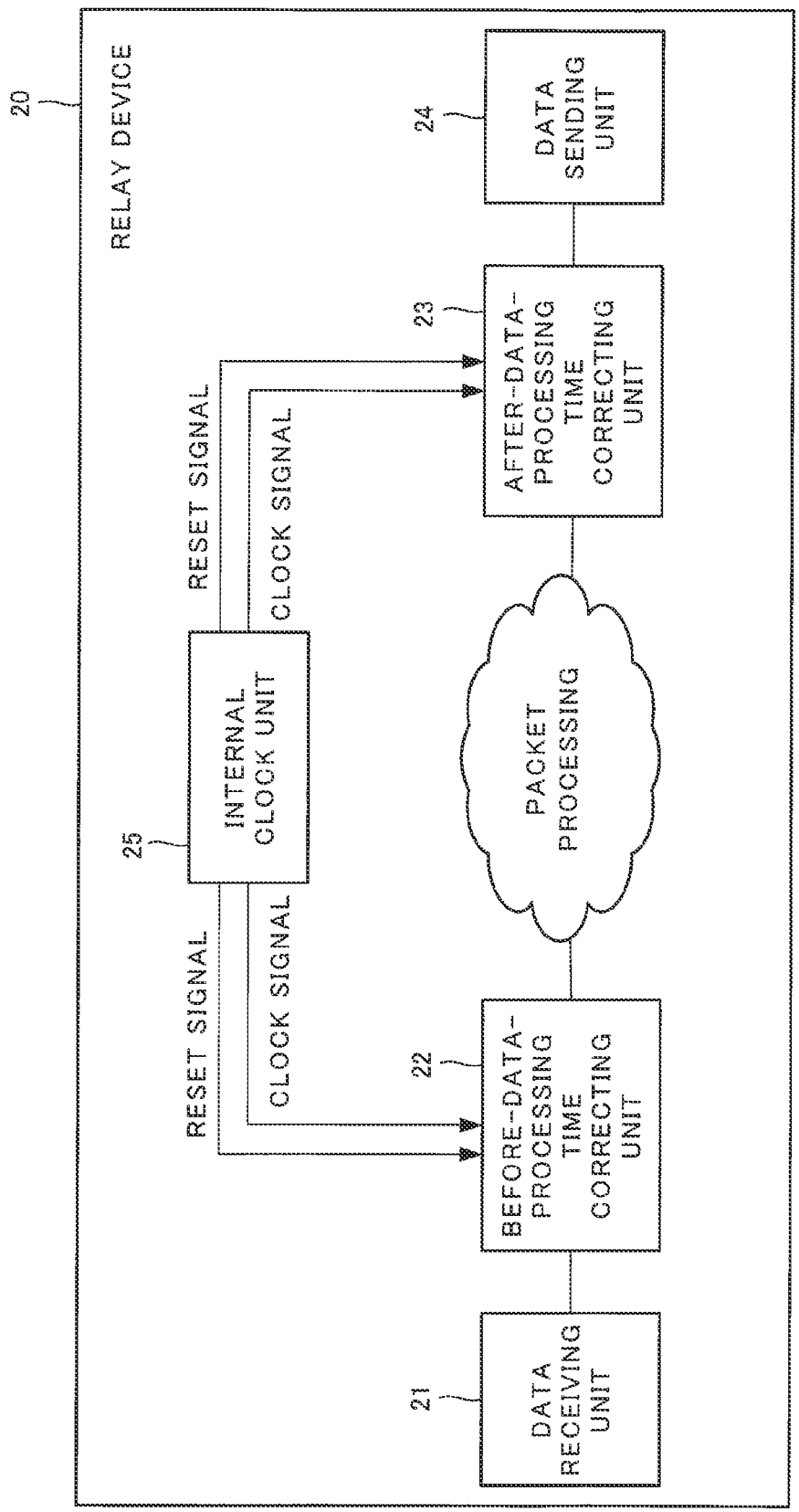
FIG. 3 is a configuration diagram of a relay device according to the exemplary embodiment 2.

Using FIG. 3, the following describes a configuration example of the relay device 20 according to the exemplary embodiment 2 of the present invention.

The internal clock unit 25 generates a clock signal used in a circuit, a functional block, or the like in the relay device 20. The internal clock unit 25 may be, for example, an oscillator. For example, the internal clock unit 25 outputs the clock signal to the before-data-processing time correcting unit 22 and the after-data-processing time correcting unit 23. The before-data-processing time correcting unit 22 and the after-data-processing time correcting unit 23 can recognize present time using the clock signal output from the internal clock unit 25.

For example, the internal clock unit 25 outputs a reset signal and the clock signal to each of the before-data-processing time correcting unit 22 and the after-data-processing time correcting unit 23. Concretely, the internal clock unit 25 outputs the reset signal to the before-data-processing time correcting unit 22 using one signal line. The internal clock unit 25 outputs the clock signal to the before-data-processing time correcting unit 22 using another signal line. In the same manner, the internal clock unit 25 outputs the reset signal to the after-data-processing time correcting unit 23 using one signal line. The internal clock unit 25 outputs the clock signal to the after-data-processing time correcting unit 23 using another signal line. Further, in response to the reception of the reset signal, each of the before-data-processing time correcting unit 22 and the after-data-processing time correcting unit 23 resets a counter value of a counter included in itself. In addition, in response to the reception of the clock signal, each of the before-data-processing time correcting unit 22 and the after-data-processing time correcting unit 23 sets, as an initial value, a predetermined value in the counter included in itself. This predetermined value becomes a new counter value of its own counter. Then, the counter value increases on the basis of the number of pulses of the clock signal.

As described above, there is indicated the configuration of arranging the one relay device 20 in the packet network between the master device 16 and the slave device 32. In this case, "0" is set as the counter value in the time correction field. The before-data-processing time correcting unit 22 subtracts its own counter value set as described above, from the counter value set in the time correction field of the synchronization signal output from the data receiving unit 21. For example, when the counter value is "Ta", the before-data-processing time correcting unit 22 sets "−Ta" in the time correction field.

When the after-data-processing time correcting unit 23 receives the synchronization information on which the packet processing has been performed, the after-data-processing time correcting unit 23 adds its own counter value set as described above to the counter value set in the time correction field. For example, when the counter value is "Tb", the after-data-processing time correcting unit 23 sets "−Ta+Tb" in the time correction field. In this case, it is assumed that "−Ta" is set in the time correction field. "Tb−Ta" indicates a packet-processing time length. In other words, the packet-processing time length of the synchronization information in the relay device 20 is set in the time correction field of the synchronization information. "−Ta+Tb" set in the time correction field of the synchronization information is called time correction information. Thus, the relay device 20 of the present exemplary embodiment can calculate a time length spent in the packet processing.

In some cases, the relay device 20 receives, from the other relay device, the synchronization information whose time correction field has been updated. In this case, it is assumed that the time correction information "Tn" calculated by the other relay device is set in the time correction field. When the time correction information "Tn" is set in the time correction field, the before-data-processing time correcting unit 22 changes a value in the time correction field to "Tn−Ta". Further, in the case of receiving the synchronization information where "Tn−Ta" is set in the time correction field, the after-data-processing time correcting unit 23 changes a value in the time correction field to "Tn−Ta+Tb".

The above description represents the example where the before-data-processing time correcting unit 22 subtracts "Ta" from a value set in the time correction field. Further, the before-data-processing time correcting unit 22 may perform calculation of adding, to the time correction field, a delay length "Dx" indicating a difference between the time that the before-data-processing time correcting unit 22 receives the synchronization information and the time that the data receiving unit 21 receives the synchronization information. The delay length "Dx", in other words, indicates a transmission delay length when the synchronization information is transmitted from the data receiving unit 21 to the before-data-processing time correcting unit 22.

The delay length "Dx" is a value peculiar to the relay device 20, and is a fixed value that does not vary among different pieces of synchronization information. For this reason, the before-data-processing time correcting unit 22 may perform calculation of adding, to the time correction field, the delay length "Dx" held in advance. In other words, the before-data-processing time correcting unit 22 may perform calculation of adding "Dx-Ta" to the time correction field. When the before-data-processing time correcting unit 22 does not hold the delay length "Dx" in advance, the before-data-processing time correcting unit 22 may calculate a transmission delay length in transmission of the synchronization information between the data receiving unit 21 and the before-data-processing time correcting unit 22, each time the before-data-processing time correcting unit 22 receives the synchronization information.

The after-data-processing time correcting unit 23 may perform calculation of adding, to the time correction field, a delay length "Dy" specifying a transmission delay length between this after-data-processing time correcting unit 23 and the data sending unit 24. The delay length "Dy" may be, for example, a time length designating a difference between the time that the after-data-processing time correcting unit 23 outputs the synchronization information and the time that the data sending unit 24 sends the synchronization information to the other relay device or the slave device 32.

Similarly to the delay length "Dx", the delay length "Dy" is a value peculiar to the relay device 20, and is a fixed value that does not vary among different pieces of the synchronization information. For this reason, the after-data-processing time correcting unit 23 may perform calculation of adding, to the time correction field, the delay length "Dy" held in advance. In other words, the before-data-processing time correcting unit 22 may perform calculation of adding "Dy+Tb" to the time correction field. In other words, "Dx−Ta+Dy+Tb" is set in the time correction field. The relay device 20 performs calculation of adding "Dx" and "Dy" to the time correction field so that the packet-processing time length in the relay device 20 and the transmission delay length in the device are reflected in the time correction field.

The slave device 32 can correct the synchronization time information by recognizing, as the packet-processing time length or the data-processing time length in the relay device 20, "Dx−Ta+Dy+Tb" set in the time correction field of the synchronization information received from the relay device 20.

Figure 4:
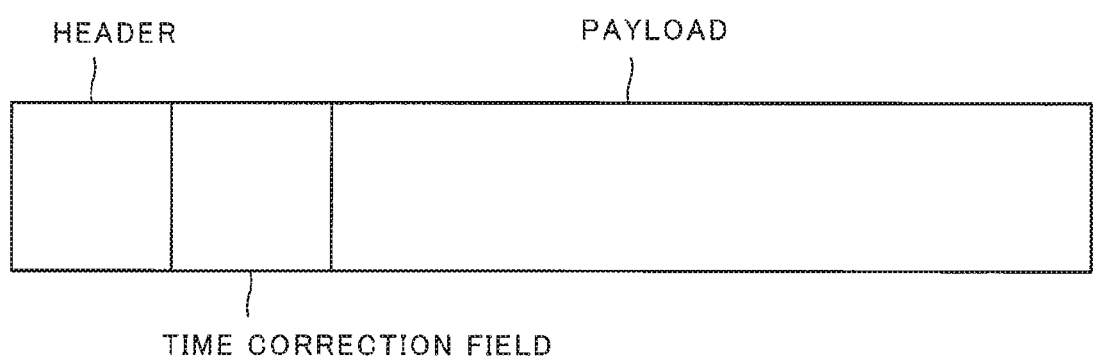
FIG. 4 is a configuration diagram of synchronization information according to the exemplary embodiment 2.

Using FIG. 4, the following describes a configuration example of the synchronization information. The synchronization information sent to the relay device 20 by the master device 16 includes a header, a payload, and the time correction field. Since the header and the payload are ones in a frame or packet used generally, its detailed description is omitted. For example, the time correction field may be defined as a part of the header, or defined as a part of usual data in the payload.

Figure 5:
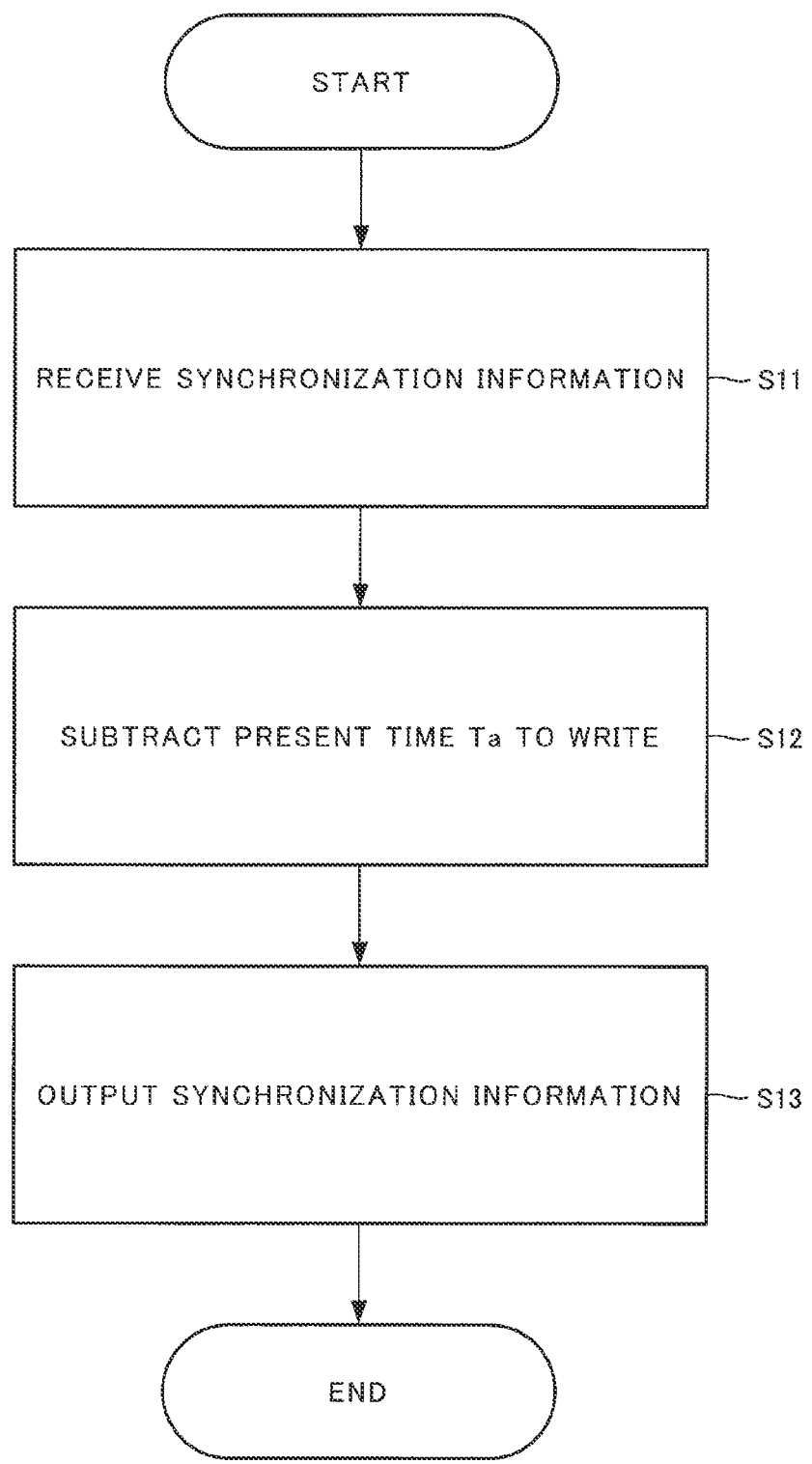
FIG. 5 illustrates a flow of a time-correction-field updating process in a before-data-processing time correcting unit according to the exemplary embodiment 2.

Using FIG. 5, the following describes a flow of a time-correction-field updating process in the before-data-processing time correcting unit 22 according to the exemplary embodiment 2 of the present invention. First, the data receiving unit 21 receives the synchronization information sent from the master device 16 or the other relay device (S11).

Next, the before-data-processing time correcting unit 22 subtracts the time "Ta" indicating present time, from a value set in the time correction field of the synchronization information (S12). The before-data-processing time correcting unit 22 sets "−Ta" when no value is set in the time correction field, and sets "Tn−Ta" when "Tn" is set in the time correction field.

Next, the before-data-processing time correcting unit 22 outputs the synchronization information whose time correction field has been updated, to the circuit or functional block that performs the packet processing (S13).

The before-data-processing time correcting unit 22 may also add the delay length "Dx" at the time of subtracting the time "Ta" at Step S12.

Figure 6:
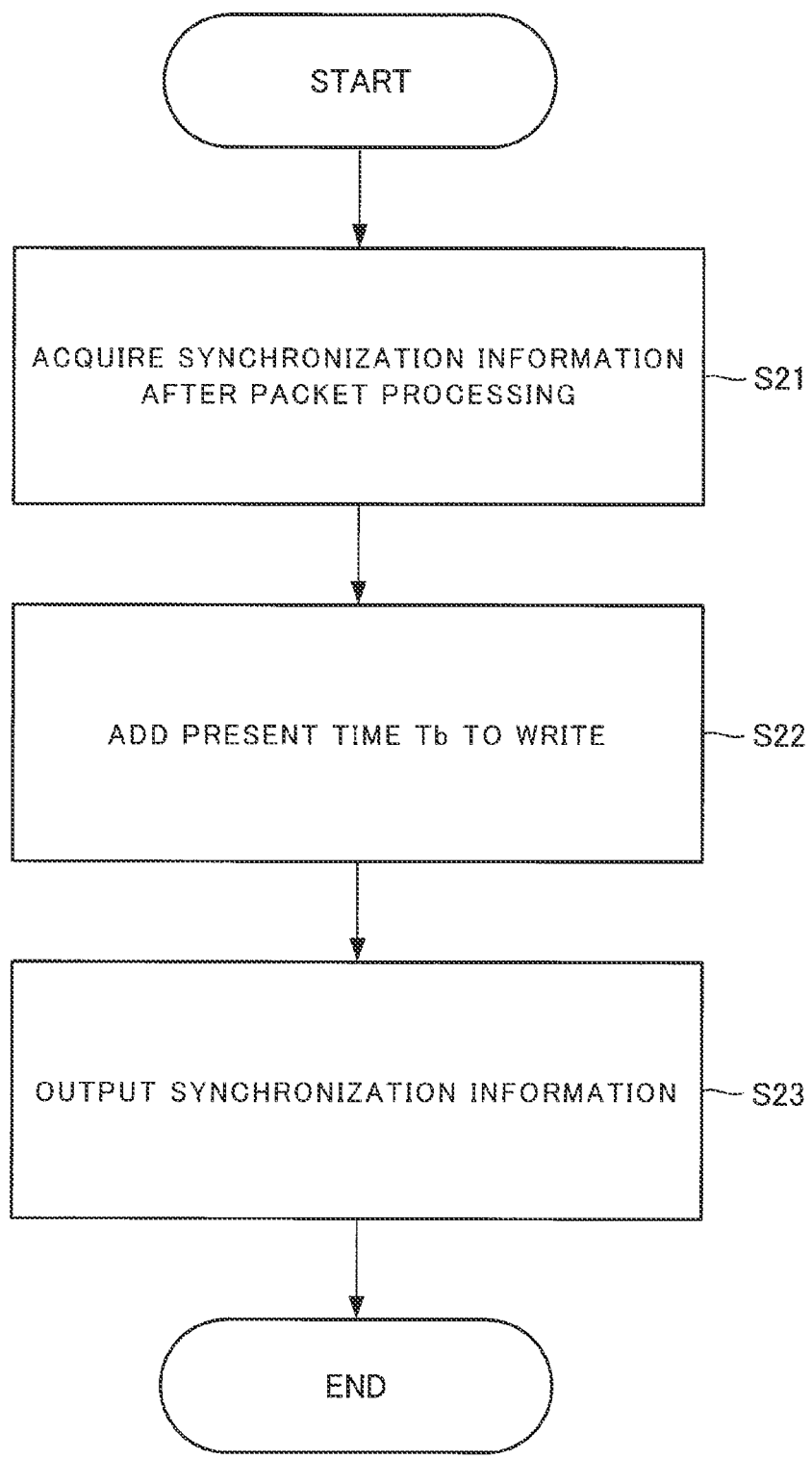
FIG. 6 illustrates a flow of a time-correction-field updating process in an after-data-processing time correcting unit according to the exemplary embodiment 2.

Using FIG. 6, the following describes a flow of a time-correction-field updating process in the after-data-processing time correcting unit 23 according to the exemplary embodiment 2 of the present invention. First, the after-data-processing time correcting unit 23 acquires the synchronization information on which the packet processing has been performed (S21).

Next, the after-data-processing time correcting unit 23 adds the time "Tb" indicating present time, to the value set in the time field of the synchronization information (S22). The after-data-processing time correcting unit 23 may add the time "Tb" so that "−Ta+Tb" or "Tn−Ta+Tb", for example, is set in the time correction field.

The after-data-processing time correcting unit 23 outputs, to the data sending unit 24, the synchronization information whose time correction field has been updated (S23).

The after-data-processing time correcting unit 23 may also add the delay length "Dy" at the time of adding the time "Tb" at Step S22.

As described above, using the time correcting system according to the exemplary embodiment 2 of the present invention enables the slave device 32 to correct the synchronization time information by taking into account the packet processing delay occurring in the relay device 20.

Here, the relay device 20 can perform the process in the before-data-processing time correcting unit 22 illustrated in FIG. 5, and the process in the after-data-processing time correcting unit 23 illustrated in FIG. 6, independently of each other. In other words, the after-data-processing time correcting unit 23 may add the present time "Tb" to the time correction fields in the order of acquiring the pieces of synchronization information.

Concretely, to calculate a packet-processing time length of particular synchronization information (hereinafter referred to as synchronization information A) in a relay device, generally, there is a necessity that the relay device collects the time of receiving the synchronization information A and the time of sending the synchronization device A, and calculates its difference. Then, the relay device sets, in the time correction field, the information of the calculated difference. In other words, to calculate the packet-processing delay length, the relay device needs to specify the synchronization information A, and manage the receiving time and the sending time of the synchronization information A. For this reason, the relay device needs to track the synchronization information A in its own device. In this case, the relay device needs a function of relating to each other the receiving time and the sending time of the synchronization information A and managing such receiving time and sending time.

Meanwhile, the relay device 20 according to the exemplary embodiment 2 of the present invention does not need to specify the synchronization information A, and therefore does not need to manage the receiving time and the sending time of the synchronization information. Concretely, in the relay device 20, the before-data-processing time correcting unit 22 and the after-data-processing time correcting unit 23 update the time correction field of the synchronization information individually. In the synchronization information, the time that this information is received by the before-data-processing time correcting unit 22 is set in the time correcting field. For this reason, when the after-data-processing time correcting unit 23 updates the time correcting field of arbitrary synchronization information, the packet-processing time length is thereby set in the time correcting field. Thus, in the case of using the relay device 20 according to the exemplary embodiment 2 of the present invention, it is unnecessary to provide the function of relating to each other the receiving time and the sending time of the synchronization information A and managing such receiving time and sending time.

Here, when the number of the data receiving units 21 differs from the number of the data sending units 24, or in other cases, the relay device 20 sometimes does not perform packet processing in the order of receiving pieces of synchronization information. Since the relay device 20 according to the exemplary embodiment of the present invention does not need to track particular synchronization information A in the device, the packet-processing time length can be reflected in the updated time correcting field even when the processing order is changed in the relay device 20.

Exemplary Embodiment 3

Figure 7:
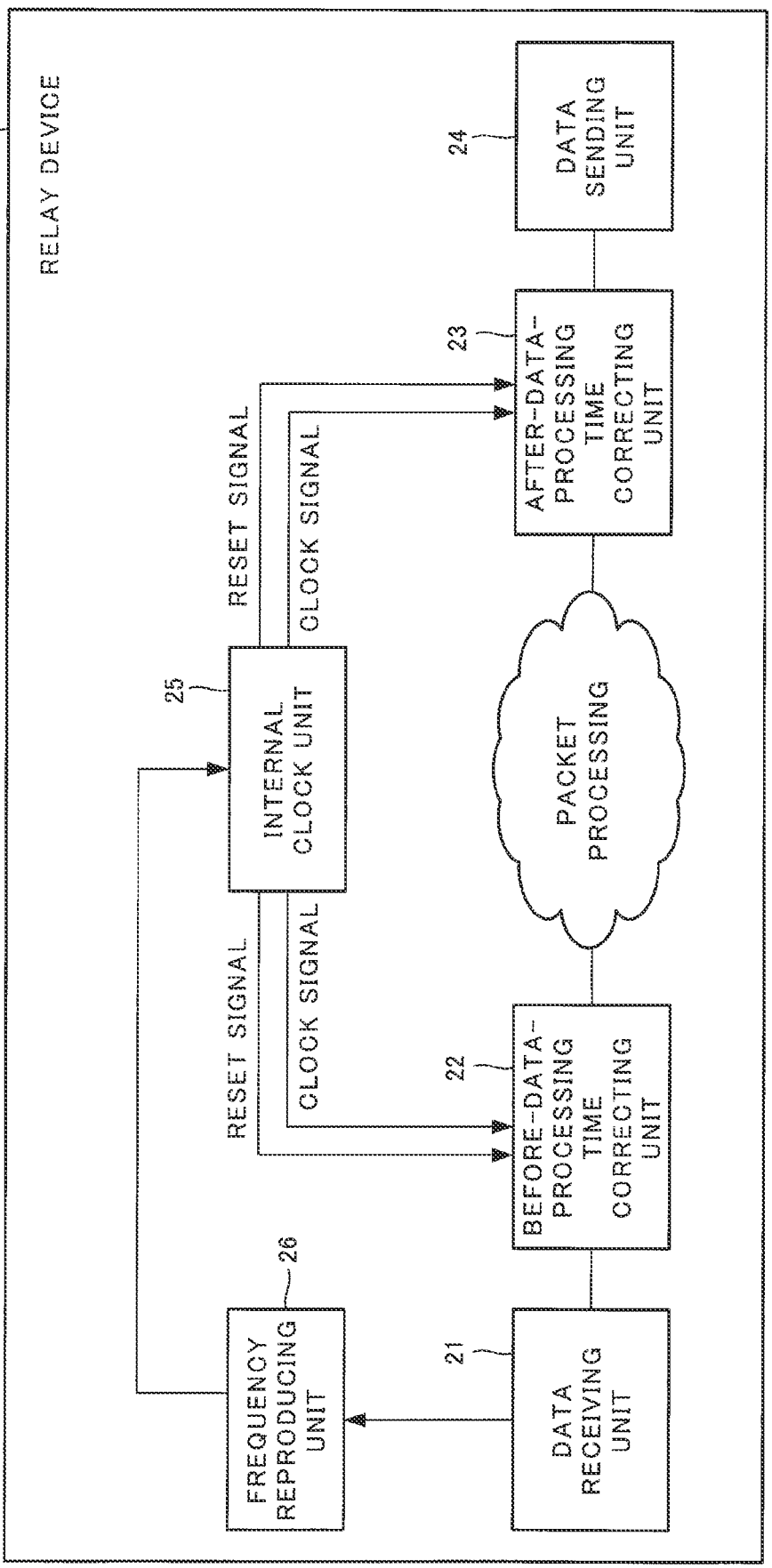
FIG. 7 is a configuration diagram of a relay device according to an exemplary embodiment 3.

Using FIG. 7, the following describes a configuration example of the relay device 20 according to an exemplary embodiment 3 of the present invention. The relay device 20 in this drawing is configured by adding a frequency reproducing unit 26 to the relay device 20 of FIG. 3. Since the other configuration except for the frequency reproducing unit 26 is the same as FIG. 1 and FIG. 3, the description about the same configuration as FIG. 1 and FIG. 3 is omitted.

The frequency reproducing unit 26 uses the synchronization signal sent from the master device 16 to reproduce a clock signal used in the master device 16. Concretely, the frequency reproducing unit 26 uses the method determined in the IEEE1588 or IEEE1588Version2 (hereinafter referred to as IEEE1588) to reproduce the clock signal. For example, the frequency reproducing unit 26 uses receiving interval information of the synchronization information (packet data) sent by the IEEE1588 method, to reproduce the clock signal. In the reproduction of the clock signal using the receiving interval information, the adaptive clock recovery (ACR) prescribed in the ITU-T G.8265.1 or the like other than the IEEE1588 method may be used.

Further, the receiving interval of the packet data sometimes varies among plural pieces of packet data due to a congestion situation of the network or the like. In such a case, the receiving intervals of plural pieces of packet data may be statistically processed to calculate the receiving interval of the packet data. For example, an average value of the values of the plural receiving intervals may be calculated, or a center value of the plural receiving intervals may be calculated.

As described above, the frequency reproducing unit 26 reproduces the clock signal used in the master device 16, and outputs the reproduced clock signal to the internal clock unit 25. The internal clock unit 25 generates the clock signal synchronizing with the clock signal output from the frequency reproducing unit 26. For example, the internal clock unit 25 may output, to the before-data-processing time correcting unit 22 and the after-data-processing time correcting unit 23, a counter value that is incremented in accordance with a clock timing determined on the basis of the clock signal output from the frequency reproducing unit 26. Since the process in which the before-data-processing time correcting unit 22 and the after-data-processing time correcting unit 23 calculate the packet-processing time length using the clock signal output from the internal clock unit 25 is the same as that in FIG. 3, its detailed description is omitted.

Figure 8:
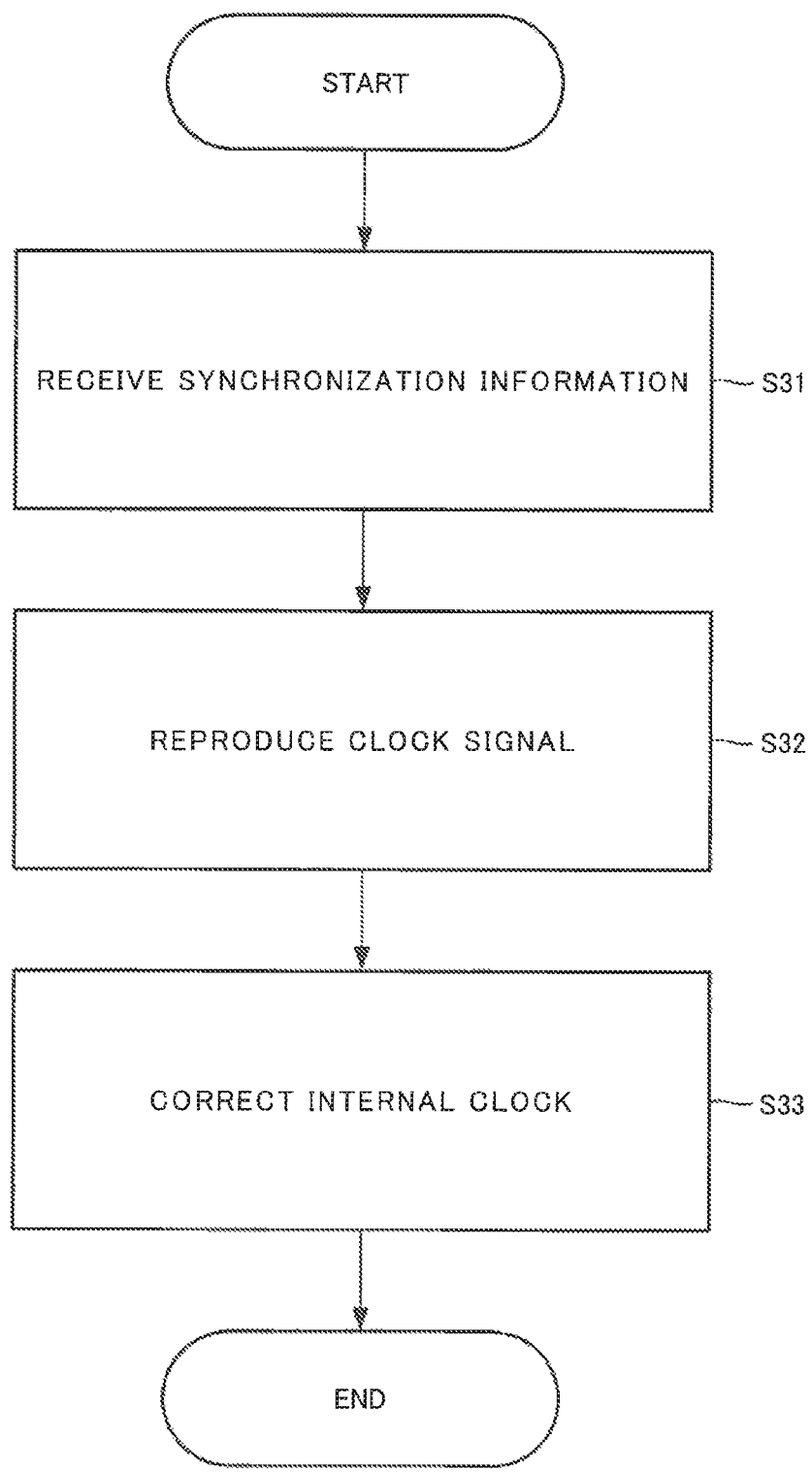
FIG. 8 illustrates a flow of a frequency reproducing process in a frequency reproducing unit according to an exemplary embodiment 3.

Using FIG. 8, the following describes a flow of a frequency reproducing process in the frequency reproducing unit 26. First, the data receiving unit 21 receives the synchronization information sent from the master device 16 or the other relay device (S31). Next, the frequency reproducing unit 26 acquires the synchronization information received by the data receiving unit 21, and reproduces the clock signal using the acquired synchronization information (S32). For the reproduction of the clock signal using the synchronization information, various methods including the IEEE1588 and the ACR are proposed, and a method used in the frequency reproducing unit 26 is not limited to the specific method.

Next, the frequency reproducing unit 26 outputs the reproduced clock signal to the internal clock unit 25 to correct the clock signal in the internal clock unit 25 (S33). In other words, the frequency reproducing unit 26 outputs, to the internal clock unit 25, the clock signal reproduced in its own device, as the clock signal used for generating the clock signal in the internal clock unit 25.

As described above, the relay device 20 according to the exemplary embodiment 3 of the present invention can operate the internal clock unit 25, using the same clock signal as the signal generated in a frequency source, i.e., an oscillator used in the master device 16. Thereby, the before-data-processing time correcting unit 22 and the after-data-processing time correcting unit 23 can use, as the present time "Ta" and "Tb", the time information generated on the basis of the clock signal of the signal generated by the oscillator used in the master device 16. For this reason, the packet-processing time length calculated in the relay device 20 is calculated with the same accuracy as the processing time length in the case of using the clock used in the master device 16.

When the internal clock unit 25 used in the relay device 20 differs in accuracy from the clock used in the master device 16, accurate synchronization with the time generated in the master device 16 cannot be performed even though the slave device 32 uses the value set in the time correction field to perform time correction.

In other words, when the packet-processing time length in the relay device 20 differs between the case of using the internal clock unit 25 and the case of using the clock in the master device 16, the slave device 32 cannot perform accurate synchronization with the time generated in the master device 16. That is, in some cases, the packet-processing time length may be calculated as time "T+α" when using the internal clock unit 25 even when the time "T" is spent, in the packet processing in the relay device 20, in the case where the clock in the master device 16 is used.

In other words, when the value of the time correction field updated using the internal clock unit 25 of the relay device 20 is used in the slave device 32, an error occurs by "a" from the time information in the case of using the clock generated in the master device 16.

Meanwhile, the relay device 20 uses the internal clock unit 25 synchronizing with the clock in the master device 16 so that the error "a" in the packet-processing time length does not occur. Thus, the slave device 32 uses the value set in the time correction field to thereby accurately generate the synchronization time information synchronizing with the time generated in the master device 16.

The master device 16 is a device that is a standard of the synchronization time information generated in the plural devices. For this reason, the master device 16 needs to use a highly accurate clock. When the relay device 20 does not use the frequency reproducing unit 26, a clock synchronized with the clock used in the master device 16 needs to be included, for example, in the internal clock unit 25, in order to highly accurately synchronize with the clock of the master device 16. In such a case, it is feared that cost in the relay device 20 rises. In contrast to this, using the frequency reproducing unit 26 eliminates the requirement that the internal clock unit 25 has performance as high as the clock used in the master device 16. For this reason, when the frequency reproducing unit 26 is used, it is possible to eliminate the fear that the cost rises by use of a highly accurate clock.

Although the above description for FIG. 7 is represented by citing the IEEE1588 and the ACR as the method for reproducing the frequency, the Synchronous Ethernet may be used alternatively. In the method using the Synchronous Ethernet, the frequency is reproduced using the synchronization signal sent via a physical layer. For this reason, even when congestion occurs in the network by frequent transmission of the packet data corresponding to a layer upper than the physical layer, the congestion does not influence the synchronization signal sent via the physical layer. For this reason, when using the synchronization signal sent via the physical layer, an advantage can be obtained in that the fluctuation does not occur.

Exemplary Embodiment 4

Figure 9:
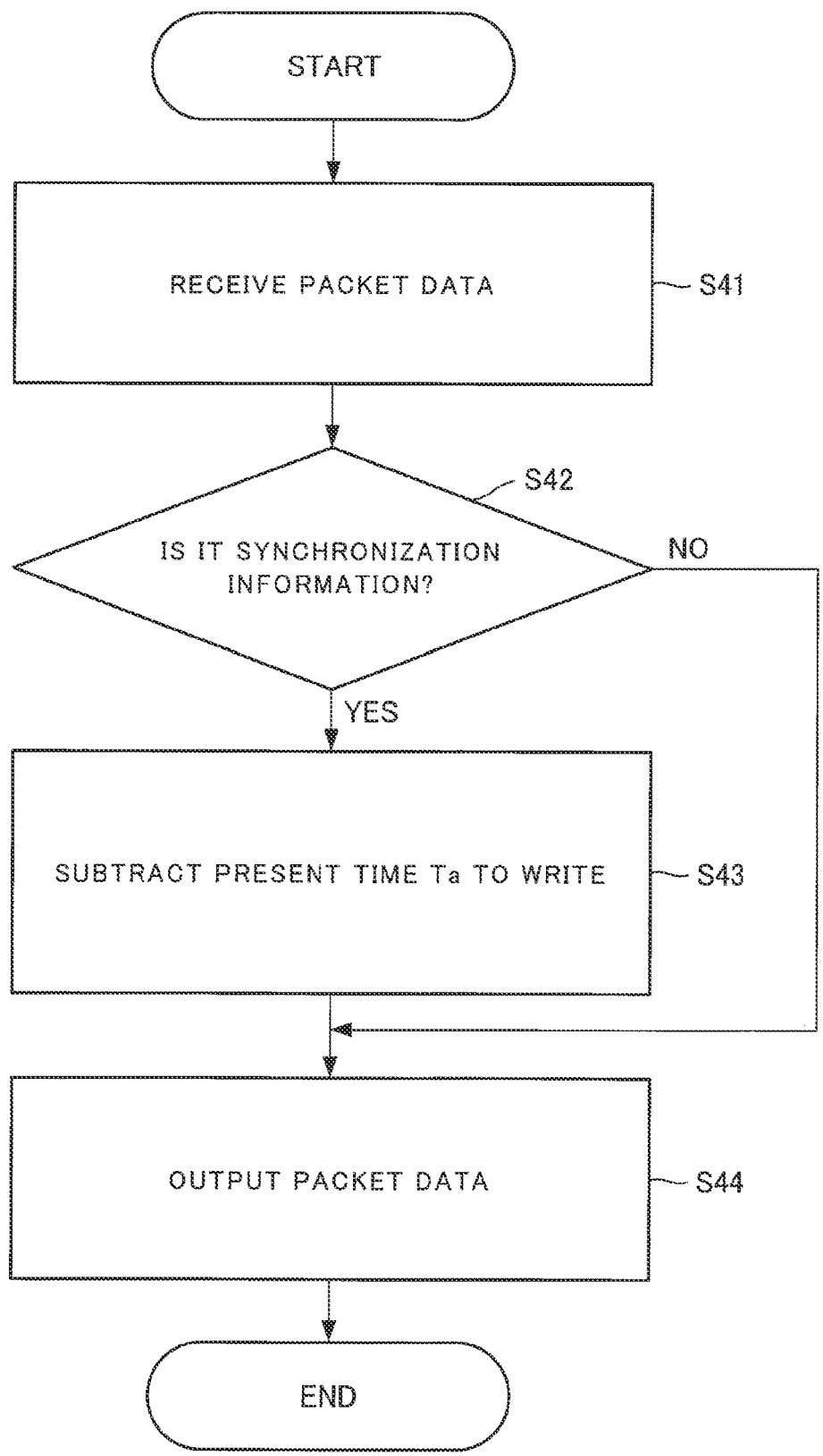
FIG. 9 illustrates a flow of a time-correction-field updating process in a before-data-processing time correcting unit according to an exemplary embodiment 4.

Using FIG. 9, the following describes a flow of a time-correction-field updating process in the before-data-processing time correcting unit 22 according to an exemplary embodiment 4 of the present invention. The present exemplary embodiment is mainly characterized in that the before-data-processing time correcting unit 22 and the after-data-processing time correcting unit 23 determine whether the received packet data is the synchronization information or not. In the present exemplary embodiment, this makes it possible to perform the process of subtraction or addition of the present time "Ta" or "Tb" only when the received packet data is the synchronization information. Therefore, it is possible to reduce processing loads in the before-data-processing time correcting unit 22 and the after-data-processing time correcting unit 23.

First, the data receiving unit 21 receives the packet data (S41). Next, the before-data-processing time correcting unit 22 determines whether or not the packet data received by the data receiving unit 21 is the synchronization information sent from the master device 16 (S42). The before-data-processing time correcting unit 22 may determine whether or not the packet data is the synchronization information, according to whether or not the time correction field is set in the received packet data, or whether or not identification information indicating different synchronization information is set in the received packet data, for example.

When the before-data-processing time correcting unit 22 determines that the data is the synchronization information, the before-data-processing time correcting unit 22 subtracts the time "Ta" indicating the present time, from the value set in the time correction field of the synchronization information (S43). Next, the before-data-processing time correcting unit 22 outputs the packet data to the circuit or functional block that performs the packet processing (S44).

When the before-data-processing time correcting unit 22 determines that the packet data is not the synchronization information at Step S42, the before-data-processing time correcting unit 22 proceeds to the process at Step S44 without performing Step S43.

Figure 10:
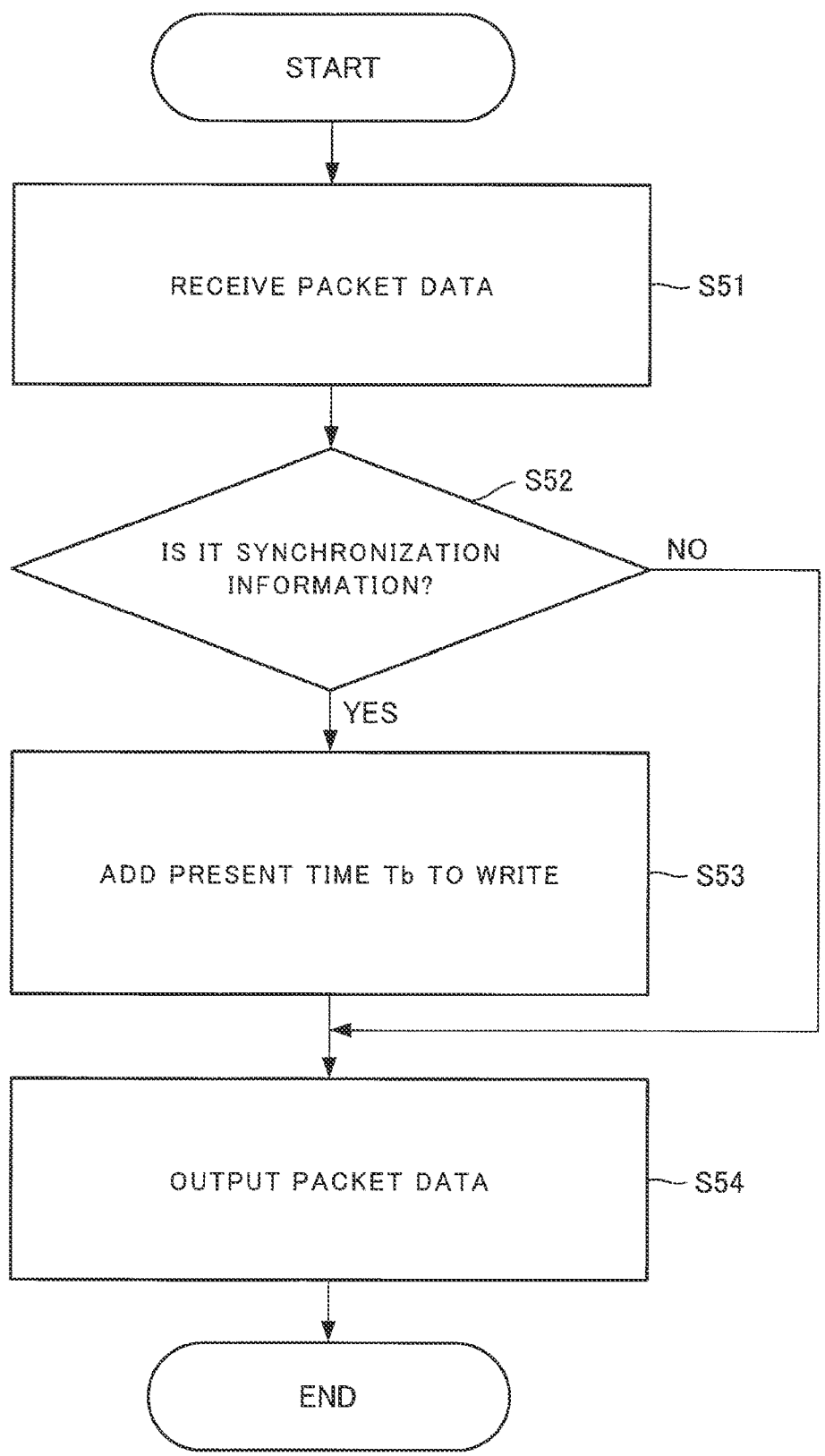
FIG. 10 illustrates a flow of a time-correction-field updating process in an after-data-processing time correcting unit according to the exemplary embodiment 4.

Using FIG. 10, the following describes a flow of a time-correction-field updating process in the after-data-processing time correcting unit 23 according to the exemplary embodiment 4 of the present invention. First, the after-data-processing time correcting unit 23 receives the packet data on which the packet processing has been performed (S51).

Next, the after-data-processing time correcting unit 23 determines whether the received packet data is the synchronization information or not (S52). In the determination of whether the received packet data is the synchronization information or not, the same determining method as that at Step S42 of FIG. 9 may be used.

When the after-data-processing time correcting unit 23 determines that the data is the synchronization information, the after-data-processing time correcting unit 23 adds the time "Tb" indicating the present time, to the value set in the time correction field of the synchronization information (S53). Next, the after-data-processing time correcting unit 23 outputs the packet data to the circuit or functional block that performs the packet processing (S54).

When the after-data-processing time correcting unit 23 determines that the packet data is not the synchronization information at Step S52, the after-data-processing time correcting unit 23 proceeds to the process at Step S54 without performing Step S53.

As described above, the before-data-processing time correcting unit 22 and the after-data-processing time correcting unit 23 use the flow of the time-correction-field updating processes according to the exemplary embodiment 4 of the present invention to thereby determine whether or not the received packet data is the synchronization information. Accordingly, the before-data-processing time correcting unit 22 and the after-data-processing time correcting unit 23 can perform the process of subtraction or addition of the present time "Ta" or "Tb" only when the packet data is the synchronization information. This enables to reduce processing loads in the before-data-processing time correcting unit 22 and the after-data-processing time correcting unit 23.

The present invention is not limited to the above exemplary embodiments, and can be appropriately modified within the scope that does not depart from the essence.

The above-described exemplary embodiments are described as typical examples of the present invention. The present invention, however, is not limited to the above-described exemplary embodiments. In other words, various modes understandable to a person skilled in the art can be applied to the present invention within the scope of the present invention.

This application is based upon and claims the benefit of priority from Japanese patent application No. 2014-025564, filed on Feb. 13, 2014, the disclosure of which is incorporated herein in its entirety by reference.

REFERENCE SIGNS LIST

10 Time standard device
12 GNSS satellite
14 GNSS receiver
16 Master device
20 Time synchronization device (relay device)

21 Data receiving unit
22 Before-data-processing time correcting unit
23 After-data-processing time correcting unit
24 Data sending unit
25 Internal clock unit
26 Frequency reproducing unit
30 Client device
32 Slave device

The invention claimed is:

1. A time synchronization method comprising:
generating, using a time standard device, time information;
generating, using a client device, synchronization time information synchronized with the time information generated in the time standard device;
relaying, between the time standard device and the client device, synchronization information including a time correction field used when the synchronization time information is corrected;
receiving a packet data comprising the synchronization information sent from the time standard device;
determining whether the received packet data comprises the synchronization information;
updating the time correction field by subtracting information indicating a time at which the synchronization information is received, from time correction information set in the time correction field;
updating the time correction field by adding information indicating a time after performing data processing on the synchronization information, to the time correction information in the time correction field; and
sending, to the client device, the synchronization information whose time correction field is updated.

2. The time synchronization method according to claim 1, comprising:
reproducing a frequency used in the time standard device, by using the synchronization information sent from the time standard device; and
generating information indicating a time, used in updating the time correction field, by using the reproduced frequency.

3. The time synchronization method according to claim 2, wherein in reproducing the frequency, the frequency is reproduced by using a time stamp of the synchronization information sent as a packet.

4. The time synchronization method according to claim 2, wherein in reproducing the frequency, the frequency is reproduced by using the time information transmitted via a physical layer and generated in the time standard device.

5. A time synchronization method comprising:
receiving a data packet comprising synchronization information sent from a time standard device, the synchronization information including a time correction field used when correcting synchronization time information generated so as to synchronize with time information generated in the time standard device;
determining whether the received packet data comprises the synchronization information;
updating the time correction field by subtracting information indicating a time at which the synchronization information is received, from time correction information set in the time correction field;
updating the time correction field by adding information indicating a time after performing data processing on the synchronization information, to the time correction information of the updated time correction field; and
sending, to a client device, the synchronization information whose time correction field is updated.

6. The time synchronization method according to claim 5, further comprising:
reproducing a frequency used in the time standard device, by using the synchronization information sent from the time standard device, after receiving the synchronization information; and
providing information indicating a time, used in updating the time correction field, by using the reproduced frequency.

7. The time synchronization method according to claim 6, wherein
in reproducing the frequency, the frequency is reproduced by using a time stamp of the synchronization information sent as a packet.

8. The time synchronization method according to claim 6, wherein
in reproducing the frequency, the frequency is reproduced by using the time information transmitted via a physical layer and generated in the time standard device.

9. The time synchronization method according to claim 5, further comprising:
asynchronously generating information indicating a time, used in updating the time correction field, with time information generated in the time standard device.

* * * * *